(12) United States Patent
Hagmaier

(10) Patent No.: US 9,073,696 B2
(45) Date of Patent: Jul. 7, 2015

(54) CURVED BELT CONVEYOR

(75) Inventor: Christian Hagmaier, Sinsheim-Reihen (DE)

(73) Assignee: Interroll Holding AG (CH)

( * ) Notice: Subject to any disclaimer, the term of this patent is extended or adjusted under 35 U.S.C. 154(b) by 282 days.

(21) Appl. No.: 13/809,815

(22) PCT Filed: Apr. 27, 2012

(86) PCT No.: PCT/EP2012/001829
§ 371 (c)(1),
(2), (4) Date: Jan. 11, 2013

(87) PCT Pub. No.: WO2012/146388
PCT Pub. Date: Nov. 1, 2012

(65) Prior Publication Data
US 2013/0105284 A1    May 2, 2013

(30) Foreign Application Priority Data

Apr. 29, 2011  (DE) .......................... 10 2011 100 043

(51) Int. Cl.
| | | |
|---|---|---|
| *B65G 13/02* | (2006.01) | |
| *B65G 13/08* | (2006.01) | |
| *B65G 15/60* | (2006.01) | |
| *B65G 17/00* | (2006.01) | |
| *B65G 15/02* | (2006.01) | |
| *B65G 21/16* | (2006.01) | |
| *B65G 39/12* | (2006.01) | |

(52) U.S. Cl.
CPC ................ *B65G 15/60* (2013.01); *B65G 15/02* (2013.01); *B65G 21/16* (2013.01); *B65G 39/12* (2013.01)

(58) Field of Classification Search
CPC ..................................................... B65G 15/00
See application file for complete search history.

(56) References Cited

U.S. PATENT DOCUMENTS

| | | | |
|---|---|---|---|
| 3,951,256 A | 4/1976 | Gurewitz | |
| 5,860,512 A | 1/1999 | Gianvito et al. | |
| 6,125,995 A * | 10/2000 | Layne et al. | 198/842 |
| 6,644,467 B1 | 11/2003 | Chiuch | |

(Continued)

FOREIGN PATENT DOCUMENTS

| | | |
|---|---|---|
| DE | 2 020 434 | 11/1971 |
| DE | 195 15 631 | 10/1996 |

(Continued)

OTHER PUBLICATIONS

International Search Report of Oct. 17, 2012.

(Continued)

*Primary Examiner* — Yolanda Cumbess
(74) *Attorney, Agent, or Firm* — Gerald E. Hespos; Michael J. Porco; Matthew T. Hespos

(57) ABSTRACT

According to the invention, the curved belt conveyor (2) has at least one continuous belt (4) which runs along a curve, is guided over two deflection rollers (8), and has a bulge-type enlargement (24) at the outer rim of the curve, said bulge-type enlargement (24) extending continuously along an edge of the continuous belt. Means (26) for supporting the continuous belt in the direction of the outer rim of the curve are arranged exclusively within the continuous belt, said supporting means contacting the bulge-type enlargement (24) in the area of faces (26) of the deflection rollers (8) facing the outer rim of the curve.

7 Claims, 3 Drawing Sheets

(56) References Cited

U.S. PATENT DOCUMENTS

| 7,150,352 | B2 | 12/2006 | Cotter et al. | |
|---|---|---|---|---|
| 7,604,112 | B1 * | 10/2009 | Lee | 198/831 |
| 7,832,549 | B2 | 11/2010 | Honeycutt | |
| 8,322,519 | B2 | 12/2012 | Kuhn | |

FOREIGN PATENT DOCUMENTS

| DE | 37 07 558 | 9/1998 |
|---|---|---|
| DE | 19805204 A1 | 12/1999 |
| EP | 1 529 008 | 3/2008 |
| FR | 2 660 292 | 10/1991 |
| JP | 53-60077 | 5/1978 |
| JP | 06-340315 | 12/1994 |
| WO | 2009/141157 | 11/2009 |

OTHER PUBLICATIONS

German Examination Report of Feb. 2, 2012.

* cited by examiner

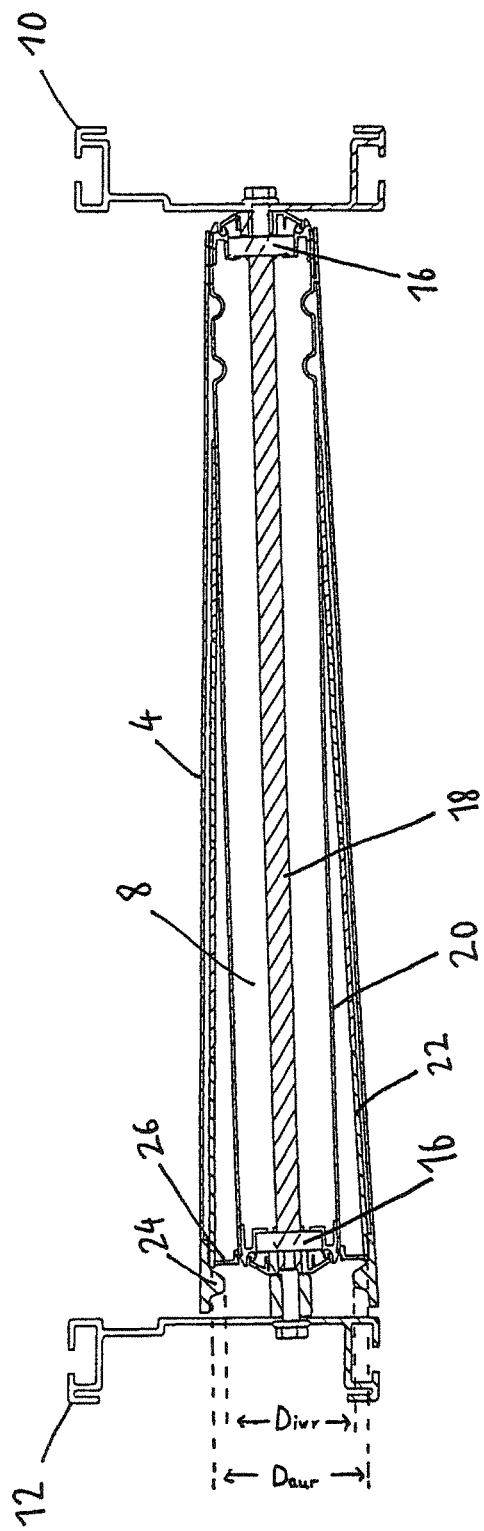

CURVED BELT CONVEYOR

BACKGROUND OF THE INVENTION

1. Field of the Invention

The present invention relates to a curved belt conveyor.

2. Description of the Related Art

In a curved belt conveyor, a conveyor belt or continuous belt matched to a curve shape is usually driven in a circumferential, or continuous, manner by guiding the continuous belt around return rollers, the rotation axes of the return rollers being arranged at an angle with respect to each other. Here, at least one return roller is driven, so that a load-bearing upper strand of the continuous belt travels in the conveying direction, whereas a lower strand travels in the opposite direction on a lower side. A good to be conveyed, which is placed on the continuous belt, can thereby be conveyed around a curve. Mostly, curve angles of 90° or 180° are realized by means of several curve segments of driven continuous belts.

By the rotation axes of the return rollers being arranged at an angle with respect to each other, the forces acting on the continuous belt due to the drive have a component transverse to the conveying direction. These forces transverse to the conveying direction pull the continuous belt on the return rollers toward the curve inner side.

In order to prevent the continuous belt from slipping toward the curve inner side, the curve outer edge of the continuous belt can be circumferentially, or continuously, provided with a V-belt on the side facing toward the rollers, according to WO 2009/141157 A. Tensioning rollers arranged along the curve outer frame of the curved belt conveyor are engaged with the beveled side surfaces of the V-belt and apply a support force to the continuous belt to keep the continuous belt in position. In order to prevent the V-belt from coming off the tensioning rollers, additional pressing rollers or keeping down devices per tensioning roller have to be provided, which press down the continuous belt in the region of the V-belt from above, i.e. from the side facing away from the return rollers. These pressing rollers project from the curve outer frame of the curved belt conveyor and reduce the usable conveying area of the continuous belt.

According to EP 1 529 008 B1, disturbing tensioning devices at the curve outer frame of the curved belt conveyor can be avoided by making an area of the return rollers crowned, or by arranging additional guide rollers between adjacent belt rollers in the lower strand in order to apply the necessary support forces for the continuous belt. Thus, the entire surface of the continuous belt becomes usable. However, with such a construction, only small curve angles per continuous belt can be realized due to the support force to be applied.

Thus, it is the object of the present invention to provide a curved belt conveyor that allows using the entire bearing area of the continuous belt at large curve angles per continuous belt.

This object is solved by a curved belt conveyor according to the independent claim. Preferred embodiments are defined in the dependent claims.

SUMMARY OF THE INVENTION

One aspect for solving the object relates to a curved belt conveyor comprising at least one continuous belt running along a curve and being guided via two return rollers, wherein, on the curve outer side, the continuous belt has a bulging thickening running continuously along a belt edge of the continuous belt, wherein support means for supporting the continuous belt in the direction of the curve outer side are exclusively arranged within the continuous belt, and wherein the support means contact the bulging thickening in the region of curve-outer-side end faces of the return rollers in an interacting manner.

A continuous belt running along a curve can mean that the continuous belt is matched to the curve shape of the curved belt conveyor, and the surface or bearing area of the continuous belt runs around a curve in order to be able to convey goods around a curve. The curve may be in the horizontal plane. The curve may be a circle segment, but also an arbitrary free curve. In the case that the curve is a circle segment, the continuous belt, in the spanned position, can also have the form of a circle segment with an inner radius and an outer radius, the difference of the outer and inner radii representing the width of the continuous belt transverse to the conveying direction. In other words, the surface of the continuous belt can be a conical surface between two parallel planes perpendicular to the cone axis. The continuous belt can be a transverse-rigid belt, the ends of which are connected or sewn and/or glued together. The continuous belt can also be referred to as a continuous belt loop.

The bulging thickening continuously running along the belt edge of the continuous belt can be formed integrally with the continuous belt already during the production of the continuous belt. However, the bulging thickening can also be connected to the continuous belt by gluing and/or sewing at a later time. The bulging thickening can be arranged exclusively on the underside of the continuous belt, i.e. on the side facing toward the return rollers. In other words, the bulging thickening can be arranged within the continuous belt, or project to the inside of the continuous belt. The inside of the continuous belt means the region or space enclosed by the loop formed by the continuous belt. Moreover, the belt edge of the continuous belt with the bulging thickening projects from the curve-outer-side end or the curve-outer-side edge of the return rollers in the width direction transversely to the conveying direction, i.e. the bulging thickening does not rest on the return roller. The bulging thickening can be made of plastic material and can have flat side faces slightly inclined to the normal, the width of the bulging thickening transverse to the longitudinal axis of the bulging thickening decreasing from the continuous belt to the tip of the bulging thickening. The bulging thickening can also be formed as a taper gib/V-ledge.

By the support means for supporting the continuous belt in the direction of the curve outer side are exclusively arranged within the continuous belt, the bearing area of the continuous belt can be usable across the entire belt width. In other words, all support means for supporting the continuous belt in the direction of the curve outer side are arranged in the region or space enclosed by the continuous belt. Here, support means for supporting the continuous belt in the direction of the curve outer side can be means that prevent the continuous belt from slipping on the return rollers in the direction of the curve inner side. To this end, the support means can apply support forces to the continuous belt in the direction of the curve outer side. The support means do not have any components, such as keeping down devices, arranged outside the continuous belt loop.

The support means contacting the bulging thickening in the region of curve-outer-side end faces of the return rollers in an interacting manner can mean that the support means are arranged in the region of the curve-outer-side end faces of the return rollers. Thereby, further support elements, such as tensioning elements, arranged on the outer frame of the curved belt conveyor can be omitted.

The return rollers can be formed conically and at their ends be supported at curve inner and curve outer frames or racks of the curved belt conveyor. Due to the conical configuration, velocity differences along the width of the continuous belt can be compensated for. Alternatively or in addition, the return rollers can also have a plurality of rolling bodies arranged next to each other transversely to the conveying direction, which can be rotatable independently from each other to compensate for velocity differences along the width of the continuous belt. Along the belt curve, between the two return rollers, there can be arranged further rollers that can also be formed conically and at their ends can be supported at curve inner and curve outer frames or racks of the curved belt conveyor, so that the continuous belt is carried off across the entire bearing area in a rolling manner. The rollers can also be configured differently from the return rollers. The further rollers prevent slacking of the continuous belt in particular when heavy goods are conveyed. Instead of further rollers, plates can be arranged between the return rollers and the continuous belt as well, on which plates the continuous belt is carried off in a sliding manner. In the case of conically formed rollers or return rollers, the rollers or return rollers can be arranged such that the bearing area formed by them is plane or horizontal. The continuous belt can be driven in the conveying direction via the return roller at the end of the bearing area of the continuous belt. To this end, this return roller can be mechanically connected to a motor, for example an electric motor to drive same. The upper strand or the bearing area of the continuous belt can thus be the load strand, or pulling strand. Other or further rollers can be driven as well though, such as the second return roller and/or one or more of the rollers arranged between the return rollers.

Preferably, the support means are formed by the curve-outer-side end faces of the return rollers.

By the support means being formed by the end faces of the return rollers, the necessity to provide any separate support elements can be eliminated. Here, the curve-outer-side end faces of the return rollers, in particular the outer radial rim of the end faces of the return rollers or the curve-outer-side outer radial edge of the return rollers, can contact the bulging thickening in an interacting manner. Thus, the curve-outer-side end faces of the return rollers can transfer support forces to the continuous belt via the bulging thickening in a positive manner. This is accomplished in that the bulging thickening projecting to the inside of the continuous belt, upon wrapping of the continuous belt around the return rollers in the wrapping region, forms a smaller inner radius than the outer radius of the end face of the return roller, so that the bulging thickening can be supported on the curve-outer-side end faces of the return rollers in a positive manner. Advantageously, the tension force of the continuous belt in the conveying direction, which presses the continuous belt tightly onto the return rollers, prevents the bulging thickening from coming off or slipping from the end faces of the return rollers.

Preferably, wrap angles of the continuous belt around the return rollers are each 180°.

Here, the wrap angle does not have to be exactly 180°, the wrap angle can also be 10° more or less. If a tensioning roller is used in the slack strand, the wrap angle can also be 20° more or less. Due to the large wrap angle, a sufficiently large bearing area for transferring the support forces between the support means and the bulging thickening can be provided.

Preferably, at least 95% of the support forces acting on the bulging thickening are transferred via the curve-outer end faces of the return rollers.

It is also possible to transfer 99% or even 100% of the support forces acting on the bulging thickening via the curve-outer end faces of the return rollers. If further rollers are arranged between the return rollers, a small proportion of the support forces acting on the bulging thickening can also be transferred via the curve-outer end faces of these further rollers. However, the proportion is very small, since the curve-outer-side belt rim of the continuous belt between the two return rollers is almost tension-free. That is, in the region between the return rollers, the curve-outer-side rim region of the continuous belt rests only loosely on the rollers, so that no great support forces can be transferred from the curve-outer-side end faces of the rollers to the bulging thickening. The greatest tension forces occur at the curve-outer-side wrap regions of the two return rollers though.

Preferably, the rotation axes of the return rollers assigned to the continuous belt are arranged at an angle with respect to each other, the angle being between 10° and 60°, preferably in the range of 45°.

Due to the great support forces that can be transferred to the continuous belt according to the present invention, the rotation axes of the two return rollers assigned to the continuous belt can be arranged at an angle of up to 60° in the horizontal plane with respect to each other without the continuous belt slipping on the rollers or slipping off the rollers owing to the transverse forces that occur. Each arbitrary angle between 10° and 60°, 30° and 60°, as well as 30 and 45° can be realized. In particular, 30° segments, 45° segments or 60° segments can be realized by means of the continuous belt enclosing the return rollers. By means of two continuous belts with two return rollers each, which are arranged at an angle of approximately 42° with respect to each other, or by means of three continuous belts with two return rollers each, which are arranged at an angle of approximately 27° with respect to each other, a curved belt conveyor capable of conveying goods around a curve of 90° can be realized. By means of three continuous belts with two return rollers each, which are arranged at an angle of approximately 57° with respect to each other, a curved belt conveyor capable of conveying goods around a curve of 180° can be realized. The exact angle between the return rollers depends on the dimensioning of the curved belt conveyor, and also on the required tension of the continuous belt, which can be created by displacing a return roller by means of a tensioning element.

Preferably, the curved belt conveyor forms a curve portion that encloses an angle of 90°.

Preferably, the curved belt conveyor comprises two continuous belts, which run along the curve and are guided via two return rollers each, wherein the rotation axes of the return rollers assigned to the continuous belts are each arranged at an angle of 42° with respect to each other.

Preferably, the curved belt conveyor comprises three continuous belts, which run along the curve and are guided via two return rollers each, wherein the rotation axes of the return rollers assigned to the continuous belts are each arranged at an angle of 27° with respect to each other.

The present invention is not limited to the above-mentioned embodiments. Instead, individual features of the embodiments can be arbitrarily combined to obtain further aspects and embodiments.

The invention will be described in the following by means of an embodiment with reference to the figures.

BRIEF DESCRIPTION OF THE DRAWINGS

FIG. 3 shows the cross section of the curved belt conveyor along the line A-A in FIG. 2.

DETAILED DESCRIPTION OF THE PREFERRED EMBODIMENTS

Figure 1:
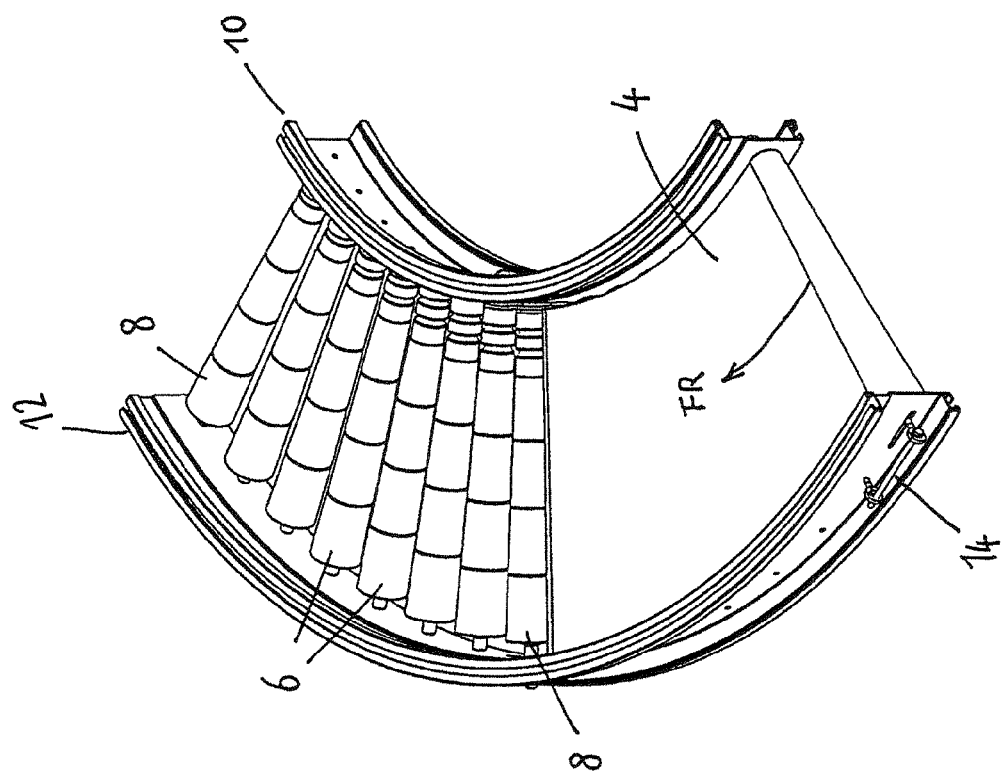
FIG. 1 shows the curved belt conveyor in an oblique view.

FIG. 1 shows the curved belt conveyor 2 in an oblique view. For illustration purposes, the continuous belt 4 is omitted in one of the two 45° curve segments. Overall, the illustrated curved belt conveyor 2 encloses an angle of 90°. The outer return rollers 8 and the rollers 6 arranged between the return rollers 8 are, at their ends, rotatably supported on the curve inner frame 10 and on the curve outer frame 12. The rollers 6 and the return rollers 8 are formed conically, this conical form being realized by four conical rolling bodies arranged next to each other, which are rotatable with respect to each other. The tensioning device 14 serves to apply the required tension force in the longitudinal direction or in the conveying direction FR of the continuous belt 4 in order to be able to securely drive the continuous belt 4 and convey goods to be conveyed. The tension force is applied by displacing the non-driven return roller opposite to the conveying direction FR by means of the tensioning device 14.

Figure 2:
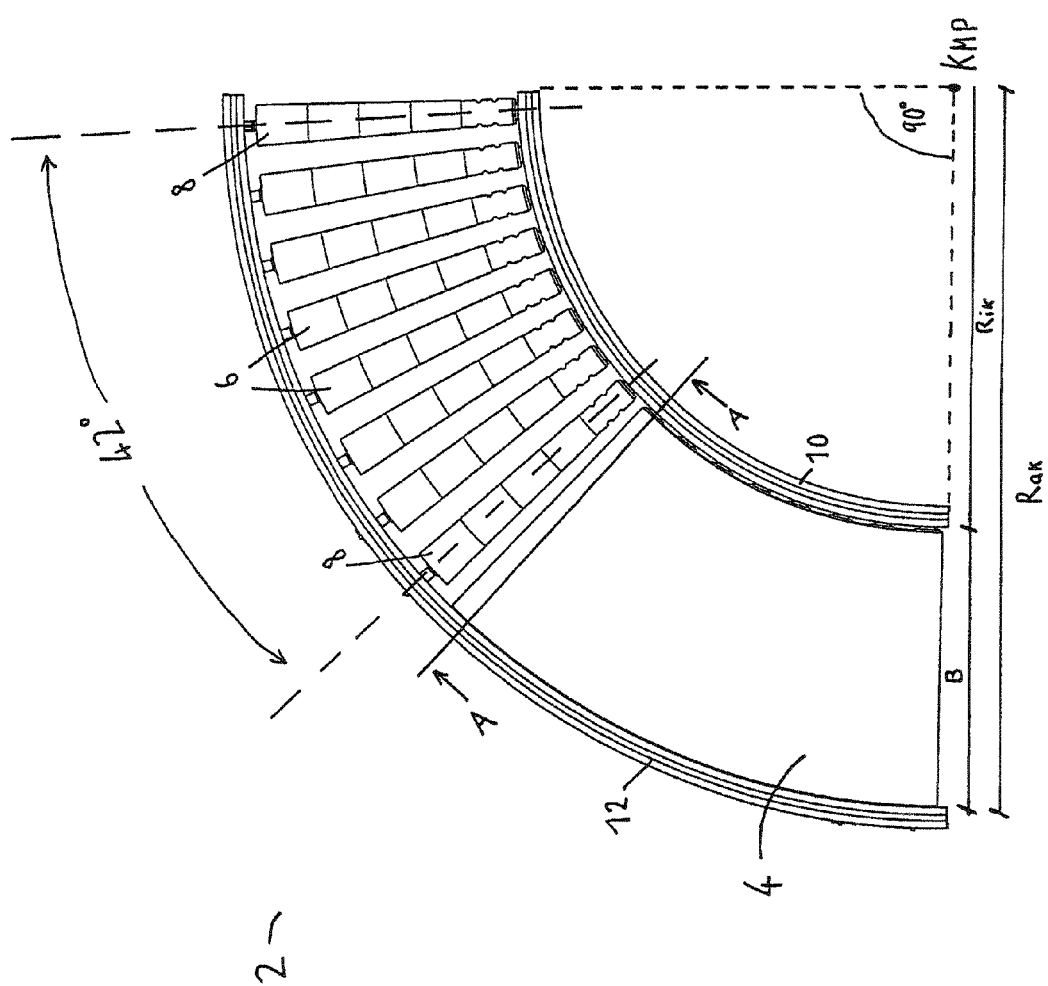
FIG. 2 shows the curved belt conveyor in a top view.

FIG. 2 shows the curved belt conveyor 2 of FIG. 1 in a top view. The curved belt conveyor 2 or the curve inner and outer frames 10, 12 of the curved belt conveyor 2 form a 90° circle segment with a circle center KMP. The continuous belt 4, which substantially covers the intermediate region between the curve inner and outer frames 10, 12, also has the form of a circle segment with the circle center KMP. The difference of the outer radius Rak of the continuous belt and the inner radius Rik of the continuous belt is the width B of the continuous belt. The rotation axes of the return rollers 8, 8 are arranged at an angle of approximately 41° with respect to each other, so that two continuous belts spanned around two return rollers each can, when adjoining or juxtaposed, enclose an angle of 90°. Here, a small gap remains between the two continuous belts.

FIG. 3 shows the cross section of the curved belt conveyor along the line A-A in FIG. 2. The section A-A is along the rotation axis of a return roller 8. The return roller 8 has an inner shaft 18 and, at its two ends, is rotatably supported on the curve inner frame 10 and the curve outer frame 12 via ball bearings 16. Moreover, the return roller 8 has an inner cylinder 20 on which the conical outer roller element 22 is fitted or arranged. The outer roller element can be composed of a plurality of conical rolling bodies arranged next to each other, which can be rotatable with respect to each other. The continuous belt 4 wraps around the return roller 8 or is spanned thereon. On the curve outer belt rim or on the curve outer belt edge, the continuous belt 4 has a bulging thickening 24. The curve-outer-side end face 26 of the return roller 8 contacts the bulging thickening 24 in an interacting manner and transfers support forces to the continuous belt 4 in a positive manner, which forces prevent the continuous belt 4 from slipping or slipping off toward the curve inner side. The positive transfer of the support forces is in particular possible since the bulging thickening 24, upon wrapping of the return roller 8, has an inner diameter Diwv that is smaller than the outer diameter Daur of the curve-outer-side end face 26 of the return roller 8.

The invention claimed is:

1. A curved belt conveyor (2), comprising at least one continuous belt (4) running along a curve and having an inner circumferential surface supported on and guided via two return rollers (8) and an outer circumferential surface facing outward from the return rollers (8), the continuous belt (4) further having a curve outer side edge and a curve inner side edge at opposite side edges of the continuous belt along the curve, a bulging thickening (24) running continuously along the continuous belt (4) at locations in proximity to the curve outer side edge of the continuous belt (4), support means for supporting the continuous belt (4), the support means being arranged only at locations opposed to the inner circumferential surface of the continuous belt (4), and end faces (26) of the support means closest to the curve outer side edge of the continuous belt (4) contacting the bulging thickening (24) in an interacting manner for preventing the belt from slipping off the support means.

2. The curved belt conveyor (2) of claim 1, wherein the end faces (26) of the support means are formed by end faces (26) of the return rollers (8) that are closest to the curve outer side edge of the continuous belt (4).

3. The curved belt conveyor (2) of claim 1, wherein the continuous belt (4) wraps 180° around each of the return rollers (8).

4. The curved belt conveyor (2) of claim 1, wherein at least 95% of the support forces acting on the bulging thickening (24) are transferred via the end faces (26) of the return rollers (8) that are closest to the curve outer side edge of the continuous belt (4).

5. The curved belt conveyor (2) of claim 1, wherein rotation axes of the return rollers (8) assigned to the continuous belt are arranged at an angle with respect to each other, the angle being between 10° and 60°.

6. The curved belt conveyor (2) of claim 1, wherein the curved belt conveyor (2) forms a curve portion that encloses an angle of 90°.

7. The curved belt conveyor (2) of claim 1, wherein there are no rollers of the curved belt conveyor (2) facing the outer circumferential surface of the continuous belt (4).

* * * * *